United States Patent
Dang et al.

(10) Patent No.: US 10,523,349 B2
(45) Date of Patent: Dec. 31, 2019

(54) METHOD FOR PROCESSING CONCURRENT SERVICES AND TERMINAL

(71) Applicant: Huawei Technologies Co., Ltd., Shenzhen (CN)

(72) Inventors: Shujun Dang, Beijing (CN); Dejing Zhang, Shanghai (CN); Jianren Huang, Shanghai (CN); Xingyu Long, Shanghai (CN); Guanzhong Tan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/503,811

(22) PCT Filed: Aug. 14, 2014

(86) PCT No.: PCT/CN2014/084362
§ 371 (c)(1),
(2) Date: Feb. 14, 2017

(87) PCT Pub. No.: WO2016/023201
PCT Pub. Date: Feb. 18, 2016

(65) Prior Publication Data
US 2017/0279548 A1    Sep. 28, 2017

(51) Int. Cl.
*H04B 17/345* (2015.01)
*H04W 28/02* (2009.01)
(Continued)

(52) U.S. Cl.
CPC ......... *H04B 17/345* (2015.01); *H04B 17/327* (2015.01); *H04B 17/336* (2015.01);
(Continued)

(58) Field of Classification Search
None
See application file for complete search history.

(56) References Cited

U.S. PATENT DOCUMENTS

| | | |
|---|---|---|
| 8,417,254 B2 | 4/2013 | Shu et al. |
| 2005/0107091 A1 | 5/2005 | Vannithamby et al. |

(Continued)

FOREIGN PATENT DOCUMENTS

| | | |
|---|---|---|
| CN | 1926905 A | 3/2007 |
| CN | 101926133 A | 12/2010 |

(Continued)

OTHER PUBLICATIONS

Foreign Communication From a Counterpart Application, European Application No. 14899634.1, Extended European Search Report dated Jul. 10, 2017, 7 pages.

(Continued)

*Primary Examiner* — Phirin Sam
*Assistant Examiner* — Mariela Vidal Carpio
(74) *Attorney, Agent, or Firm* — Conley Rose, P.C.

(57) ABSTRACT

A method for processing concurrent services and a terminal can effectively ensure that a service with a higher service priority maintains better service transmission quality in the concurrent services. The concurrent services include a first service and a second service. A service priority of the first service is higher than a service priority of the second service. The method includes: obtaining, by a terminal, channel quality information of a channel that carries the concurrent services; and blocking, by the terminal, the second service when the channel quality information meets a preset blocking condition.

25 Claims, 9 Drawing Sheets

(51) Int. Cl.
*H04B 17/327* (2015.01)
*H04B 17/336* (2015.01)
*H04W 28/06* (2009.01)
*H04W 72/08* (2009.01)

(52) U.S. Cl.
CPC ............ *H04W 28/02* (2013.01); *H04W 28/06* (2013.01); *H04W 72/085* (2013.01)

(56) References Cited

U.S. PATENT DOCUMENTS

| | | |
|---|---|---|
| 2010/0275086 A1 | 10/2010 | Bergquist et al. |
| 2010/0278152 A1 | 11/2010 | Andreozzi et al. |
| 2014/0105016 A1* | 4/2014 | Tsuda .................... H04W 28/06 370/230.1 |
| 2014/0141832 A1* | 5/2014 | Liang .................. H04W 52/146 455/522 |
| 2014/0192751 A1 | 7/2014 | Oksala et al. |
| 2015/0181497 A1* | 6/2015 | Sane .................... H04W 36/30 370/331 |

FOREIGN PATENT DOCUMENTS

| | | | |
|---|---|---|---|
| CN | 102333297 A | 1/2012 | |
| CN | 102480673 A | 5/2012 | |
| CN | 103731903 A | 4/2014 | |
| WO | WO-2012159364 A1 * | 11/2012 | .......... H04W 52/146 |

OTHER PUBLICATIONS

Foreign Communication From a Counterpart Application, PCT Application No. PCT/CN2014/084362, English Translation of International Search Report dated Apr. 20, 2015, 2 pages.

Foreign Communication From a Counterpart Application, PCT Application No. PCT/CN2014/084362, English Translation of Written Opinion dated Apr. 20, 2015, 7 pages.

Machine Translation and Abstract of Chinese Publication No. CN102333297, Jan. 25, 2012, 10 pages.

Machine Translation and Abstract of Chinese Publication No. CN102480673, May 30, 2012, 13 pages.

Foreign Communication From a Counterpart Application, Chinese Application No. 201480052111.5, Chinese Office Action dated Sep. 5, 2018, 6 pages.

* cited by examiner

METHOD FOR PROCESSING CONCURRENT SERVICES AND TERMINAL

CROSS-REFERENCE TO RELATED APPLICATIONS

This application is a national stage application of international patent application number PCT/CN2014/084362 filed on Aug. 14, 2014, which is incorporated by reference.

TECHNICAL FIELD

The present disclosure relates to the field of communications technologies, and in particular, to a method for processing concurrent services and a terminal.

BACKGROUND

With continuous evolution of a mobile communications system, a requirement for a technology that supports concurrent transmission of multiple services is gradually heightened in the market. However, while enriching user experience, concurrent services also bring about new problems.

For example, when a data service and a voice service are concurrently conducted, a user may be allowed to conduct multiple data services, such as web browsing or downloading, while answering or making a call. However, concurrent services are likely to cause a resource conflict. According to statistics, 64% of voice service drop takes place in a case of concurrent services, and consequently, service transmission quality of a voice service with a higher service priority cannot satisfy the user's requirement.

To reduce a voice service drop rate in the case of the concurrent services, currently a common solution, based on whether the user directly perceives a data service, is that when the voice service is enabled, a data service that the user does not directly perceive is blocked, and a data service that the user can directly perceive is maintained. However, although the foregoing solution can reduce the voice service drop rate to an extent, some important communications applications that the user does not directly perceive may go offline implicitly. In addition, when a data service that the user can directly perceive is still enabled, the voice service drop rate cannot be significantly reduced.

Therefore, in a case of multiple concurrent services, how to ensure that a service with a higher service priority maintains better service transmission quality in the concurrent services becomes an urgently to-be-resolved problem.

SUMMARY

Embodiments of the present disclosure provide a method for processing concurrent services and a terminal in order to effectively ensure that a service with a higher service priority maintains better service transmission quality in the concurrent services.

A first aspect of the embodiments of the present disclosure provides a method for processing concurrent services, where the concurrent services include a first service and a second service; a service priority of the first service is higher than a service priority of the second service; and the method includes: obtaining, by a terminal, channel quality information of a channel that carries the concurrent services; and blocking, by the terminal, the second service when the channel quality information meets a preset blocking condition.

With reference to the first aspect of the embodiments of the present disclosure, in a first implementation manner of the first aspect of the embodiments of the present disclosure, the method further includes: determining, by the terminal, whether a ratio of an uplink transmit power of the channel to a greatest transmit power of the terminal is greater than a preset ratio; and confirming that the channel quality information meets a preset blocking condition when the ratio of the uplink transmit power of the channel to the greatest transmit power of the terminal is greater than the preset ratio.

With reference to the first implementation manner of the first aspect of the embodiments of the present disclosure, in a second implementation manner of the first aspect of the embodiments of the present disclosure, the preset ratio is 1/4.

With reference to the first aspect of the embodiments of the present disclosure, in a third implementation manner of the first aspect of the embodiments of the present disclosure, the method further includes: determining, by the terminal, whether a downlink receive power of the channel is less than a preset reference value; and confirming that the channel quality information meets a preset blocking condition when the downlink receive power of the channel is less than the preset reference value.

With reference to the third implementation manner of the first aspect of the embodiments of the present disclosure, in a fourth implementation manner of the first aspect of the embodiments of the present disclosure, the preset reference value is −90 decibels-milliwatts (dBm).

With reference to the third implementation manner of the first aspect of the embodiments of the present disclosure, in a fifth implementation manner of the first aspect of the embodiments of the present disclosure, the downlink receive power is a reference signal received power (RSRP) or a received signal code power (RSCP).

With reference to the first aspect of the embodiments of the present disclosure, in a sixth implementation manner of the first aspect of the embodiments of the present disclosure, the method further includes determining, by the terminal, whether a downlink received carrier-to-interference ratio of the channel is less than a preset carrier-to-interference ratio, and confirming that the channel quality information meets a preset blocking condition when the downlink received carrier-to-interference ratio of the channel is less than the preset carrier-to-interference ratio.

With reference to the sixth implementation manner of the first aspect of the embodiments of the present disclosure, in a seventh implementation manner of the first aspect of the embodiments of the present disclosure, the preset carrier-to-interference ratio is −5 dB.

With reference to the sixth implementation manner of the first aspect of the embodiments of the present disclosure, in an eighth implementation manner of the first aspect of the embodiments of the present disclosure, the downlink received carrier-to-interference ratio includes a signal-to-interference-plus-noise ratio (SINR) or an energy per chip to noise power spectral density ratio ($E_c/N_0$).

With reference to the first aspect of the embodiments of the present disclosure, in a ninth implementation manner of the first aspect of the embodiments of the present disclosure, the method further includes determining, by the terminal, whether a downlink receive power of the channel is less than a first threshold, determining whether a ratio of an uplink transmit power of the channel to a greatest transmit power of the terminal is greater than a second threshold when the downlink receive power of the channel is less than the first threshold, confirming that the channel quality information meets a preset blocking condition when the downlink receive power of the channel is less than the first threshold and the ratio of the uplink transmit power of the channel to the greatest transmit power of the terminal is greater than the second threshold, and confirming that the preset blocking condition is met.

With reference to the ninth implementation manner of the first aspect of the embodiments of the present disclosure, in a tenth implementation manner of the first aspect of the embodiments of the present disclosure, the first threshold is −90 dBm, and the second threshold is 1/4.

With reference to any one of the first aspect of the embodiments of the present disclosure, or the first to the tenth implementation manners of the first aspect of the embodiments of the present disclosure, in an eleventh implementation manner of the first aspect of the embodiments of the present disclosure, blocking, by the terminal, the second service includes obtaining, by the terminal, a corresponding blocking class parameter according to the channel quality information, and blocking, by the terminal, the second service on an uplink and/or a downlink according to the blocking class parameter.

With reference to any one of the first aspect of the embodiments of the present disclosure, or the first to the tenth implementation manners of the first aspect of the embodiments of the present disclosure, in a twelfth implementation manner of the first aspect of the embodiments of the present disclosure, the first service is a voice service, and the second service is a data service.

A second aspect of the embodiments of the present disclosure provides a terminal, where concurrent services run on the terminal. The concurrent services include a first service and a second service. A service priority of the first service is higher than a service priority of the second service, and the terminal includes an obtaining unit configured to obtain channel quality information of a channel that carries concurrent services, and an execution unit configured to block a second service when the channel quality information meets a preset blocking condition.

With reference to the second aspect of the embodiments of the present disclosure, in a first implementation manner of the second aspect of the embodiments of the present disclosure, the terminal further includes a first determining unit configured to determine whether a ratio of an uplink transmit power of the channel to a greatest transmit power of the terminal is greater than a preset ratio, and a first confirmation unit configured to confirm that the channel quality information meets a preset blocking condition when the ratio of the uplink transmit power of the channel to the greatest transmit power of the terminal is greater than the preset ratio.

With reference to the second aspect of the embodiments of the present disclosure, in a second implementation manner of the second aspect of the embodiments of the present disclosure, the terminal further includes a second determining unit configured to determine whether a downlink receive power of the channel is less than a preset reference value, and a second confirmation unit configured to confirm that the channel quality information meets a preset blocking condition when the downlink receive power of the channel is less than the preset reference value.

With reference to the second aspect of the embodiments of the present disclosure, in a third implementation manner of the second aspect of the embodiments of the present disclosure, the terminal further includes a third determining unit configured to determine whether a downlink received carrier-to-interference ratio of the channel is less than a preset carrier-to-interference ratio, and a third confirmation unit configured to confirm that the channel quality information meets a preset blocking condition when the downlink received carrier-to-interference ratio of the channel is less than the preset carrier-to-interference ratio.

With reference to the second aspect of the embodiments of the present disclosure, in a fourth implementation manner of the second aspect of the embodiments of the present disclosure, the terminal further includes a fourth determining unit configured to determine whether a downlink receive power of the channel is less than a first threshold, a fifth determining unit configured to determine whether a ratio of an uplink transmit power of the channel to a greatest transmit power of the terminal is greater than a second threshold when the downlink receive power of the channel is not less than the first threshold, and a fourth confirmation unit configured to confirm that the channel quality information meets a preset blocking condition when the downlink receive power of the channel is not less than the first threshold and the ratio of the uplink transmit power of the channel to the greatest transmit power of the terminal is greater than the second threshold.

With reference to any one of the second aspect of the embodiments of the present disclosure, or the first to the fourth implementation manners of the second aspect of the embodiments of the present disclosure, in a fifth implementation manner of the second aspect of the embodiments of the present disclosure, the execution unit includes an obtaining module configured to obtain a corresponding blocking class parameter according to the channel quality information, and an execution module configured to block a second service on an uplink and/or a downlink according to the blocking class parameter.

In the technical solutions provided in the embodiments of the present disclosure, a terminal obtains channel quality information of a channel that carries concurrent services, and blocks a second service with a lower service priority in the concurrent services when the channel quality information meets a preset blocking condition. Therefore, in the embodiments of the present disclosure, whether to block the service with a lower service priority to optimize network resource allocation may be determined according to the channel quality information of the channel that carries the concurrent services, thereby ensuring that a service with a higher service priority maintains better service transmission quality in the concurrent services.

DESCRIPTION OF EMBODIMENTS

Embodiments of the present disclosure provide a method for processing concurrent services and a terminal in order to effectively ensure that a service with a higher service priority maintains better service transmission quality in the concurrent services. Detailed descriptions are separately provided below.

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by persons skilled in the art based on the embodiments of the present disclosure without creative efforts shall fall within the protection scope of the present disclosure.

In the embodiments of the present disclosure, the concurrent services include a first service and a second service. A service priority of the first service is higher than a service priority of the second service. It may be understood that in the concurrent services, a service priority of each service may be set according to a user requirement, or may be set by default in a system. This is not limited herein. In a practical application process, there may be one or more first services and second services, and this is not limited herein. It may be understood that in some embodiments, the present disclosure may further include determining whether the two services are in a service concurrent state and/or determining the service priorities of the two services.

Figure 1:
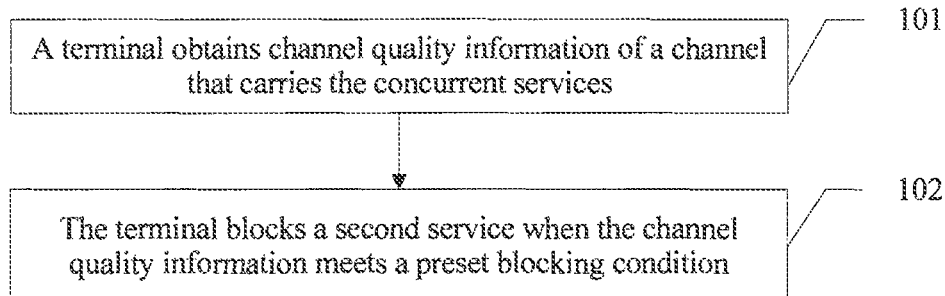
FIG. 1 is a schematic diagram of an embodiment of a method for processing concurrent services according to an embodiment of the present disclosure.

Referring to FIG. 1, an embodiment of a method for processing concurrent services according to an embodiment of the present disclosure includes the following steps.

Step 101: A terminal obtains channel quality information of a channel that carries the concurrent services.

Performance of a channel has extremely vital impact on service transmission quality of a service carried on the channel. Therefore, the terminal obtains channel quality information of the channel in order to analyze the performance of the channel using the channel quality information.

Step 102: The terminal blocks a second service when the channel quality information meets a preset blocking condition.

The terminal blocks the second service with a lower service priority in the concurrent services in order to ensure that a first service with a higher service priority maintains better service transmission quality when the obtained channel quality information meets the preset blocking condition.

In the technical solutions provided in this embodiment of the present disclosure, a terminal obtains channel quality information of a channel that carries concurrent services, and blocks a second service with a lower service priority in the concurrent services when the channel quality information meets a preset blocking condition. Therefore, in this embodiment of the present disclosure, whether to block the service with a lower service priority to optimize network resource allocation may be determined according to the channel quality information of the channel that carries the concurrent services, thereby ensuring that a service with a higher service priority maintains better service transmission quality in the concurrent services.

It should be noted that the foregoing preset blocking condition may have multiple possible description manners, which are separately explained in the following.

1: A ratio of an uplink transmit power of a channel to a greatest transmit power of a terminal is greater than a preset ratio.

Figure 2:
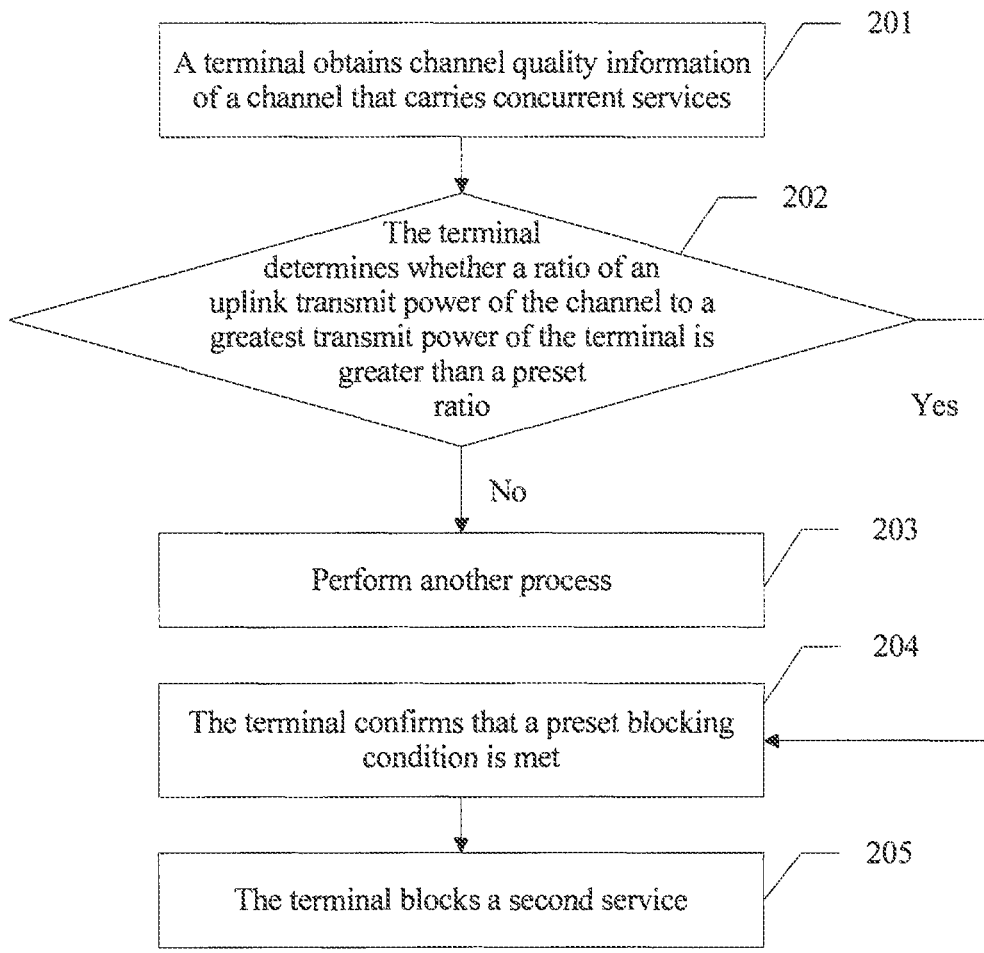
FIG. 2 is a schematic diagram of another embodiment of a method for processing concurrent services according to an embodiment of the present disclosure.

The following elaborates a specific description manner of a first preset blocking condition. Further, referring to FIG. 2, another embodiment of a method for processing concurrent services according to an embodiment of the present disclosure includes the following steps.

Step 201: A terminal obtains channel quality information of a channel that carries the concurrent services.

Performance of a channel has extremely vital impact on service transmission quality of a service carried on the channel. Therefore, the terminal obtains channel quality information of the channel in order to analyze the performance of the channel using the channel quality information. It may be understood that in addition to directly obtaining the channel quality information of the channel, the terminal may obtain the channel quality information of the channel in another manner, for example, the terminal may obtain the channel quality information of the channel from a base station or a core network device. A specific obtaining manner is not limited.

In this embodiment, the channel quality information of the channel includes an uplink transmit power of the channel. It may be understood that in this embodiment, in addition to including the foregoing content, the channel quality information of the channel may further include other information, such as a downlink receive power of the channel or a downlink received carrier-to-interference ratio of the channel. In practical application, the channel quality information of the channel may further include more information that describes a quality state of the channel, which is not limited herein.

Step 202: The terminal determines whether a ratio of an uplink transmit power of the channel to a greatest transmit power of the terminal is greater than a preset ratio, and performs step 204 if the ratio of the uplink transmit power of the channel to the greatest transmit power of the terminal is greater than the preset ratio, or performs step 203 if the ratio of the uplink transmit power of the channel to the greatest transmit power of the terminal is not greater than the preset ratio.

That is, the terminal determines whether the ratio of the uplink transmit power of the channel to the greatest transmit power of the terminal is greater than the preset ratio in order to confirm whether a preset blocking condition is met. It should be noted that when the ratio of the uplink transmit power of the channel to the greatest transmit power of the terminal is greater than the preset ratio, it indicates that channel quality of the channel is poor, and a blocking condition for blocking a second service is met, or on the contrary, when the ratio of the uplink transmit power of the channel to the greatest transmit power of the terminal is not greater than the preset ratio, it indicates that channel quality of the channel is relatively good, and in this case, both of a first service and a second service in the concurrent services may maintain relatively good service transmission quality. In this embodiment, the preset ratio is 1/4. It may be understood that the foregoing value of the preset ratio is only a preferred value, and in a practical application process, the preset ratio may be adjusted within a range, and is not limited herein.

Step 203: Perform another process.

In this embodiment, when the ratio of the uplink transmit power of the channel to the greatest transmit power of the terminal is not greater than the preset ratio, another process is performed. It may be understood that performing the other process may be ending a process, that is, the terminal performs no processing on the first service and the second service, or the terminal performs another processing process on the first service and the second service, or returns to step 201, which is not limited herein.

Step 204: The terminal confirms that a preset blocking condition is met.

In this embodiment, the preset blocking condition is met when the ratio of the uplink transmit power of the channel to the greatest transmit power of the terminal is greater than the preset ratio. That is, in this embodiment, the preset blocking condition is that the ratio of the uplink transmit power of the channel to the greatest transmit power of the terminal is greater than the preset ratio.

Step 205: The terminal blocks a second service.

The terminal blocks the second service when the channel quality information of the channel meets the preset blocking condition. In this embodiment, a blocking class parameter corresponding to the channel quality information of the channel is preset in the terminal according to a specific application scenario, and that the terminal blocks the second service may include the terminal obtains the corresponding blocking class parameter according to the channel quality information of the channel, and the terminal blocks the second service on an uplink and/or a downlink according to the blocking class parameter. For example, when the ratio of the uplink transmit power of the channel to the greatest transmit power of the terminal is greater than a first threshold, the terminal obtains a first class blocking parameter, and the terminal blocks the second service on the uplink and the downlink according to the first class blocking parameter. The terminal obtains a second class blocking parameter when the ratio of the uplink transmit power of the channel to the greatest transmit power of the terminal is greater than a second threshold but not greater than the first threshold, and the terminal blocks the second service only on the uplink according to the second class blocking parameter, and the terminal obtains a third class blocking parameter when the ratio of the uplink transmit power of the channel to the greatest transmit power of the terminal is greater than the preset ratio but not greater than the second threshold, and the terminal blocks the second service only on the downlink according to the third class blocking parameter, where the first threshold>the second threshold>the preset ratio. In this embodiment, a different corresponding blocking class parameter is set according to different channel quality information in order to perform a different-class blocking scheme in a case of different channel quality information. It may be understood that in practical application, another blocking policy may be used to block a second service. For example, with reference to the solution that is mentioned in the background and for reducing the voice service drop rate in the case of the concurrent services, when a blocking process is performed on the second service, according to whether a user directly perceives the second service, a second service that the user does not directly perceive is blocked, and a second service that the user can directly perceive is maintained. A specific blocking policy for blocking the second service is not limited herein.

In the technical solutions provided in this embodiment of the present disclosure, a terminal obtains channel quality information of a channel that carries concurrent services, and blocks a second service with a lower service priority in the concurrent services when the channel quality information meets a preset blocking condition. Therefore, in this embodiment of the present disclosure, whether to block the service with a lower service priority to optimize network resource allocation may be determined according to the channel quality information of the channel that carries the concurrent services, thereby ensuring that a service with a higher service priority maintains better service transmission quality in the concurrent services.

Further, in the technical solutions provided in this embodiment of the present disclosure, the terminal determines whether a ratio of an uplink transmit power of the channel to a greatest transmit power of the terminal is greater than a preset ratio, to confirm whether the preset blocking condition is met in order to block a second service with a lower service priority in the concurrent services when channel quality is poor. In addition, in this embodiment of the present disclosure, a different-class blocking scheme may be performed on the second service according to severity of the channel quality.

2: A downlink receive power of a channel is less than a preset reference value.

Figure 3:
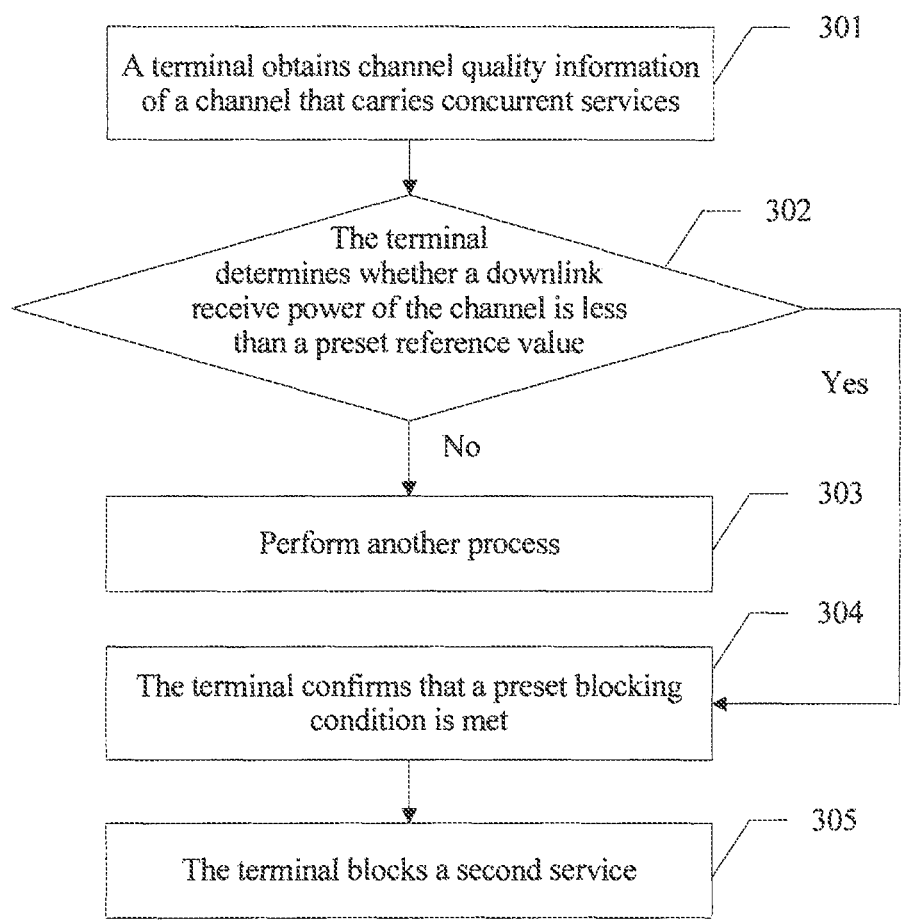
FIG. 3 is a schematic diagram of another embodiment of a method for processing concurrent services according to an embodiment of the present disclosure.

The following elaborates a specific description manner of a second preset blocking condition. Further, referring to FIG. 3, another embodiment of a method for processing concurrent services according to an embodiment of the present disclosure includes the following steps.

Step 301: A terminal obtains channel quality information of a channel that carries the concurrent services.

Performance of a channel has extremely vital impact on service transmission quality of a service carried on the channel. Therefore, the terminal obtains channel quality information of the channel in order to analyze the performance of the channel using the channel quality information. It may be understood that in addition to directly obtaining the channel quality information of the channel, the terminal may obtain the channel quality information of the channel in another manner, for example, the terminal may obtain the channel quality information of the channel from a base station or a core network device. A specific obtaining manner is not limited.

In this embodiment, the channel quality information of the channel includes a downlink receive power of the channel. It may be understood that in this embodiment, in addition to including the foregoing content, the channel quality information of the channel may further include other information, such as an uplink transmit power of the channel or a downlink received carrier-to-interference ratio of the channel. In practical application, the channel quality information of the channel may further include more information that describes a quality state of the channel, which is not limited herein.

Step 302: The terminal determines whether a downlink receive power of the channel is less than a preset reference value, and performs step 304 if the downlink receive power of the channel is less than the preset reference value, or performs step 303 if the downlink receive power of the channel is not less than the preset reference value.

That is, the terminal determines whether the downlink receive power of the channel is less than the preset reference value in order to confirm whether a preset blocking condition is met. It should be noted that when the downlink receive power of the channel is less than the preset reference value, it indicates that channel quality of the channel is poor, and a blocking condition for blocking a second service is met, or on the contrary, when the downlink receive power of the channel is not less than the preset reference value, it indicates that channel quality of the channel is relatively good, and in this case, both of a first service and a second service in the concurrent services may maintain relatively good service transmission quality. In this embodiment, the preset reference value is −90 dBm. It may be understood that the foregoing value of the preset reference value is only a preferred value, and in a practical application process, the preset reference value may be adjusted within a range, and is not limited herein.

Step 303: Perform another process.

In this embodiment, another process is performed when the downlink receive power of the channel is not less than the preset reference value. It may be understood that performing the other process may be ending a process, that is, the terminal performs no processing on the first service and the second service, or the terminal performs another processing process on the first service and the second service, or returns to step 301, which is not limited herein.

Step 304: The terminal confirms that a preset blocking condition is met.

In this embodiment, when the downlink receive power of the channel is less than the preset reference value, the preset blocking condition is met. That is, in this embodiment, the preset blocking condition is that the downlink receive power of the channel is less than the preset reference value.

Step 305: The terminal blocks a second service.

The terminal blocks the second service when the channel quality information of the channel meets the preset blocking condition. In this embodiment, a blocking class parameter corresponding to the channel quality information of the channel is preset in the terminal according to a specific application scenario, and the terminal blocking the second service may include that the terminal obtains the corresponding blocking class parameter according to the channel quality information of the channel, and the terminal blocks the second service on an uplink and/or a downlink according to the blocking class parameter. For example, when the downlink receive power of the channel is less than a third threshold, the terminal obtains a first class blocking parameter, and the terminal blocks the second service on the uplink and the downlink according to the first class blocking parameter. The terminal obtains a second class blocking parameter when the downlink receive power of the channel is less than a fourth threshold but not less than the third threshold, and the terminal blocks the second service only on the uplink according to the second class blocking parameter, and the terminal obtains a third class blocking parameter when the downlink receive power of the channel is less than the preset reference value but not less than the fourth threshold, and the terminal blocks the second service only on the downlink according to the third class blocking parameter, where the third threshold<the fourth threshold<the preset reference value. In this embodiment, a different corresponding blocking class parameter is set according to different channel quality information in order to perform a different-class blocking scheme in a case of different channel quality information. It may be understood that in practical application, another blocking policy may be used to block a second service. For example, with reference to the solution that is mentioned in the background and for reducing the voice service drop rate in the case of the concurrent services, when a blocking process is performed on the second service, according to whether a user directly perceives the second service, a second service that the user does not directly perceive is blocked, and a second service that the user can directly perceive is maintained. A specific blocking policy for blocking the second service is not limited herein.

It should be noted that in a Wideband Code Division Multiple Access (WCDMA) network, the downlink receive power refers to an RSRP, and in an Long Term Evolution (LTE) network, the downlink receive power refers to an RSCP.

In the technical solutions provided in this embodiment of the present disclosure, a terminal obtains channel quality information of a channel that carries concurrent services, and blocks a second service with a lower service priority in the concurrent services when the channel quality information meets a preset blocking condition. Therefore, in this embodiment of the present disclosure, whether to block the service with a lower service priority to optimize network resource allocation may be determined according to the channel quality information of the channel that carries the concurrent services, thereby ensuring that a service with a higher service priority maintains better service transmission quality in the concurrent services.

Further, in the technical solutions provided in this embodiment of the present disclosure, the terminal determines whether a downlink receive power of the channel is less than a preset reference value, to confirm whether the preset blocking condition is met in order to block a second service with a lower service priority in the concurrent services when channel quality is poor. In addition, in this embodiment of the present disclosure, a different-class blocking scheme may be performed on the second service according to severity of the channel quality.

3: A downlink received carrier-to-interference ratio of a channel is less than a preset carrier-to-interference ratio.

Figure 4:
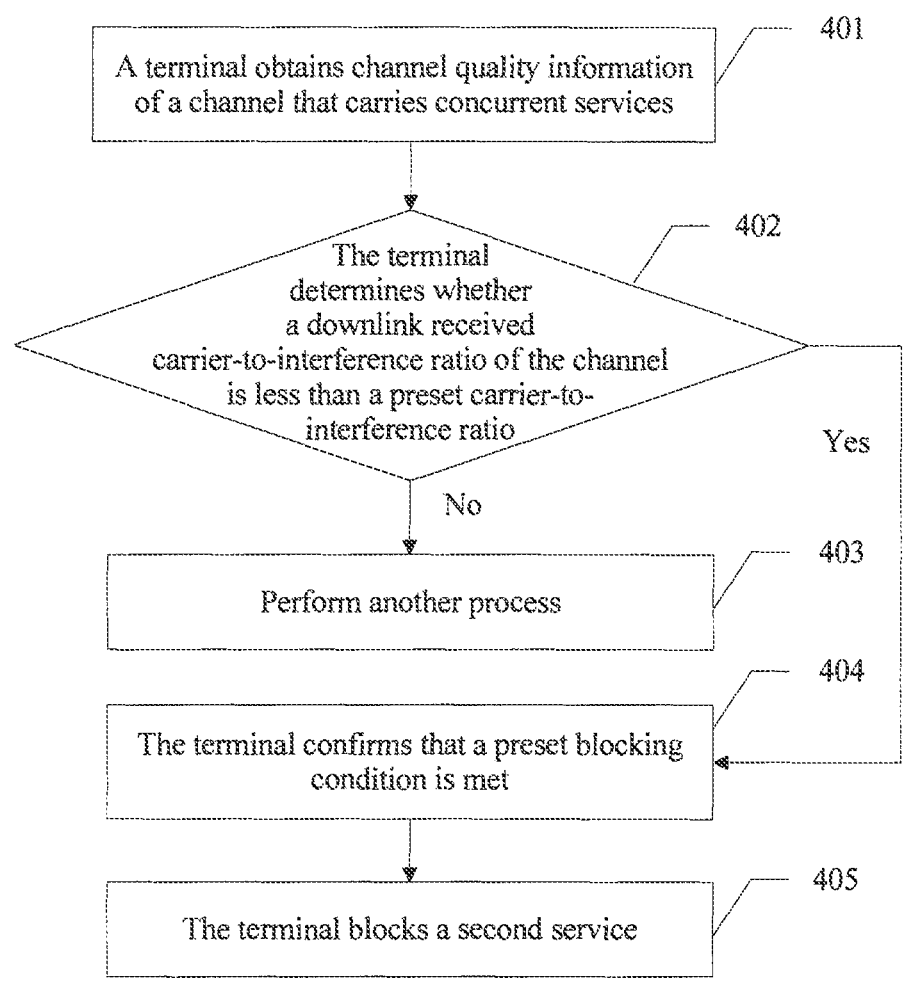
FIG. 4 is a schematic diagram of another embodiment of a method for processing concurrent services according to an embodiment of the present disclosure.

The following elaborates a specific description manner of a third preset blocking condition. Referring to FIG. 4, another embodiment of a method for processing concurrent services according to an embodiment of the present disclosure includes the following steps.

Step 401: A terminal obtains channel quality information of a channel that carries the concurrent services.

Performance of a channel has extremely vital impact on service transmission quality of a service carried on the channel. Therefore, the terminal obtains channel quality information of the channel in order to analyze the performance of the channel using the channel quality information. It may be understood that in addition to directly obtaining the channel quality information of the channel, the terminal may obtain the channel quality information of the channel in another manner, for example, the terminal may obtain the channel quality information of the channel from a base station or a core network device. A specific obtaining manner is not limited.

In this embodiment, the channel quality information of the channel includes a downlink received carrier-to-interference ratio of the channel. It may be understood that in this embodiment, in addition to including the foregoing content, the channel quality information of the channel may further include other information, such as an uplink transmit power of the channel or a downlink receive power of the channel. In practical application, the channel quality information of the channel may further include more information that describes a quality state of the channel, which is not limited herein.

Step 402: The terminal determines whether a downlink received carrier-to-interference ratio of the channel is less than a preset carrier-to-interference ratio, and performs step 404 if the downlink received carrier-to-interference ratio of the channel is less than the preset carrier-to-interference ratio, or performs step 403 if the downlink received carrier-to-interference ratio of the channel is not less than the preset carrier-to-interference ratio.

That is, the terminal determines whether the downlink received carrier-to-interference ratio of the channel is less than the preset carrier-to-interference ratio in order to confirm whether a preset blocking condition is met. It should be noted that when the downlink received carrier-to-interference ratio of the channel is less than the preset carrier-to-interference ratio, it indicates that channel quality of the channel is poor, and a blocking condition for blocking a second service is met, or on the contrary, when the downlink received carrier-to-interference ratio of the channel is not less than the preset carrier-to-interference ratio, it indicates that channel quality of the channel is relatively good, and in this case, both of a first service and a second service in the concurrent services may maintain relatively good service transmission quality. In this embodiment, the preset carrier-to-interference ratio is −5 dB. It may be understood that the foregoing value of the preset carrier-to-interference ratio is only a preferred value. In a practical application process, the preset carrier-to-interference ratio may be adjusted within a range, and is not limited herein.

Step 403: Perform another process.

In this embodiment, another process is performed when the downlink received carrier-to-interference ratio of the channel is not less than the preset carrier-to-interference ratio. It may be understood that performing the other process may be ending a process, that is, the terminal performs no processing on the first service and the second service, or the terminal performs another processing process on the first service and the second service, or returns to step 401, which is not limited herein.

Step 404: The terminal confirms that a preset blocking condition is met.

In this embodiment, when the downlink received carrier-to-interference ratio of the channel is less than the preset carrier-to-interference ratio, the preset blocking condition is met. That is, in this embodiment, the preset blocking condition is that the downlink received carrier-to-interference ratio of the channel is less than the preset carrier-to-interference ratio.

Step 405: The terminal blocks a second service.

The terminal blocks the second service when the channel quality information of the channel meets the preset blocking condition. In this embodiment, a blocking class parameter corresponding to the channel quality information of the channel is preset in the terminal according to a specific application scenario, and the terminal blocking the second service may include that the terminal obtains the corresponding blocking class parameter according to the channel quality information of the channel, and the terminal blocks the second service on an uplink and/or a downlink according to the blocking class parameter. For example, when the downlink received carrier-to-interference ratio of the channel is less than a fifth threshold, the terminal obtains a first class blocking parameter, and the terminal blocks the second service on the uplink and the downlink according to the first class blocking parameter. The terminal obtains a second class blocking parameter when the downlink received carrier-to-interference ratio of the channel is less than a sixth threshold but not less than the fifth threshold, and the terminal blocks the second service only on the uplink according to the second class blocking parameter, and the terminal obtains a third class blocking parameter when the downlink received carrier-to-interference ratio of the channel is less than the preset carrier-to-interference ratio but not less than the sixth threshold, and the terminal blocks the second service only on the downlink according to the third class blocking parameter, where the fifth threshold<the sixth threshold<the preset carrier-to-interference ratio. In this embodiment, a different corresponding blocking class parameter is set according to different channel quality information in order to perform a different-class blocking scheme in a case of different channel quality information. It may be understood that in practical application, another blocking policy may be used to block a second service. For example, with reference to the solution mentioned in the background and for reducing the voice service drop rate in the case of the concurrent services, when a blocking process is performed on the second service, according to whether a user directly perceives the second service, a second service that the user does not directly perceive is blocked, and a second service that the user can directly perceive is maintained. A specific blocking policy for blocking the second service is not limited herein.

It should be noted that in a WCDMA network, the downlink received carrier-to-interference ratio refers to an EcN0, and in an LTE network, the downlink received carrier-to-interference ratio refers to an SINR.

In the technical solutions provided in this embodiment of the present disclosure, a terminal obtains channel quality information of a channel that carries concurrent services, and blocks a second service with a lower service priority in the concurrent services when the channel quality information meets a preset blocking condition. Therefore, in this embodiment of the present disclosure, whether to block the service with a lower service priority to optimize network resource allocation may be determined according to the channel quality information of the channel that carries the concurrent services, thereby ensuring that a service with a higher service priority maintains better service transmission quality in the concurrent services.

Further, in the technical solutions provided in this embodiment of the present disclosure, the terminal determines whether a downlink received carrier-to-interference ratio of the channel is less than a preset carrier-to-interference ratio, to confirm whether the preset blocking condition is met in order to block a second service with a lower service priority in the concurrent services when channel quality is poor. In addition, in this embodiment of the present disclosure, a different-class blocking scheme may be performed on the second service according to severity of the channel quality.

Figure 5:
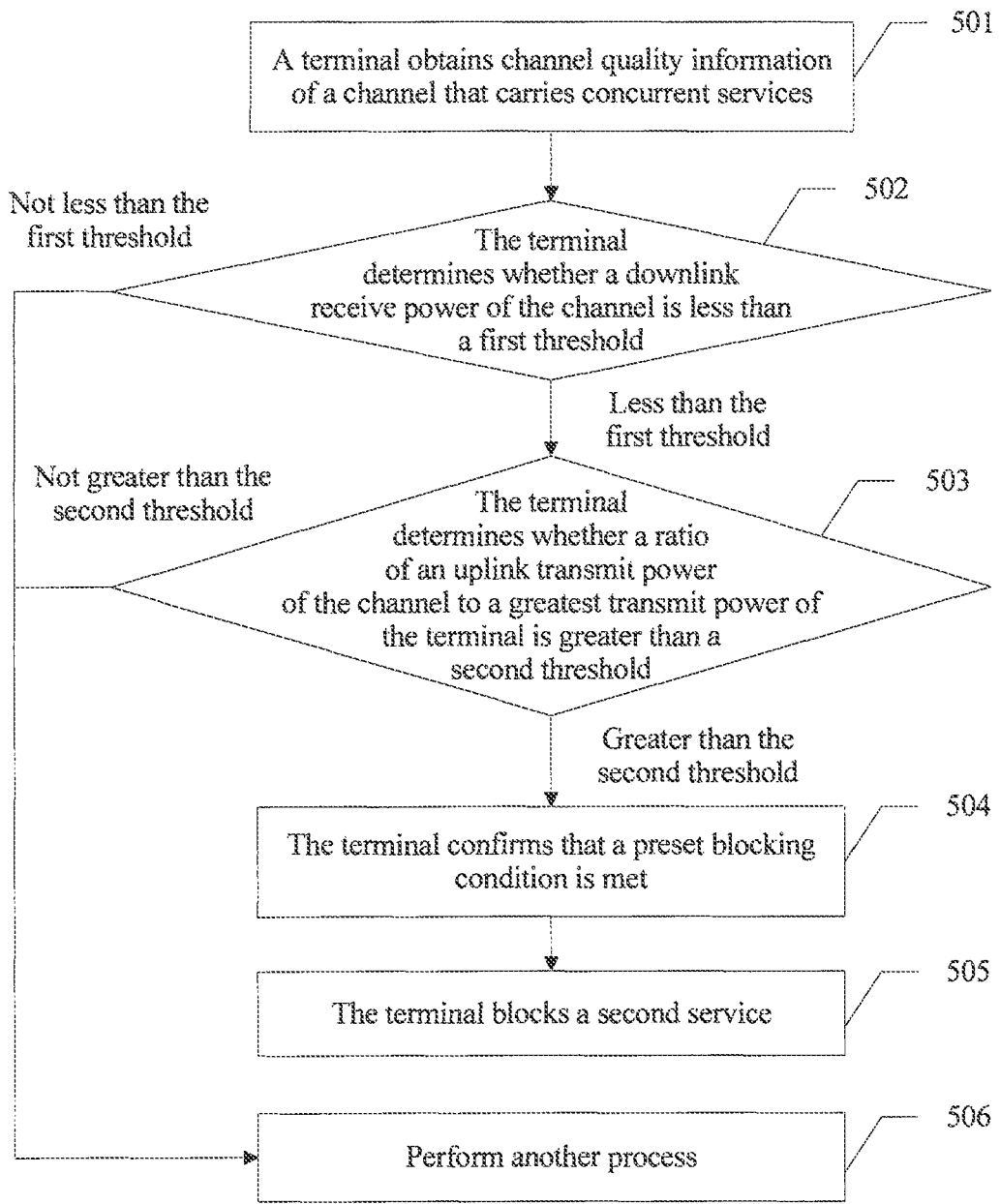
FIG. 5 is a schematic diagram of another embodiment of a method for processing concurrent services according to an embodiment of the present disclosure.

The foregoing provides only several examples to describe that the preset blocking condition may have multiple possible description manners. In practical application, it may be understood that the terminal may use the foregoing description manners in combination, or may adopt another description manner. A specific description manner is not limited herein. The following provides a detailed description using an example of a combination of the specific description manners of the first and the second preset blocking conditions. Referring to FIG. 5 that is a specific description manner of a fourth preset blocking condition, another embodiment of a method for processing concurrent services according to an embodiment of the present disclosure includes the following steps.

Step 501: A terminal obtains channel quality information of a channel that carries the concurrent services.

Performance of a channel has extremely vital impact on service transmission quality of a service carried on the channel. Therefore, the terminal obtains channel quality information of the channel in order to analyze the performance of the channel using the channel quality information. It may be understood that in addition to directly obtaining the channel quality information of the channel, the terminal may obtain the channel quality information of the channel in another manner, for example, the terminal may obtain the channel quality information of the channel from a base station or a core network device. A specific obtaining manner is not limited.

In this embodiment, the channel quality information of the channel includes an uplink transmit power and a downlink receive power of the channel, that is, the uplink transmit power and the downlink receive power of the channel are comprehensively analyzed. It may be understood that in this embodiment, in addition to including the foregoing content, the channel quality information of the channel may further include other information, such as a downlink received carrier-to-interference ratio of the channel. In practical application, the channel quality information of the channel may further include more information that is used to describe a quality state of the channel, which is not limited herein.

Step 502: The terminal determines whether a downlink receive power of the channel is less than a first threshold, and performs step 503 if the downlink receive power of the channel is less than the first threshold, or performs step 506 if the downlink receive power of the channel is not less than the first threshold.

That is, the terminal determines whether the downlink receive power of the channel is less than the first threshold. It should be noted that when the downlink receive power of the channel is not less than the first threshold, it indicates that channel quality of the channel is relatively good, and in this case, both of a first service and a second service in the concurrent services may maintain relatively good service transmission quality. In this embodiment, the first threshold is −90 dBm. It may be understood that the foregoing value of the first threshold is only a preferred value, and in a practical application process, the first threshold may be adjusted within a range, and is not limited herein.

Step 503: The terminal determines whether a ratio of an uplink transmit power of the channel to a greatest transmit power of the terminal is greater than a second threshold, and performs step 504 if the ratio of the uplink transmit power of the channel to the greatest transmit power of the terminal is greater than the second threshold, or performs step 506 if the ratio of the uplink transmit power of the channel to the greatest transmit power of the terminal is not greater than the second threshold.

That is, after determining whether the downlink receive power of the channel is less than the first threshold, the terminal further determines whether the ratio of the uplink transmit power of the channel to the greatest transmit power of the terminal is greater than the second threshold in order to confirm whether a preset blocking condition is met. It should be noted that when the downlink receive power of the channel is less than the first threshold, and the ratio of the uplink transmit power of the channel to the greatest transmit power of the terminal is greater than the second threshold, it indicates that the channel quality of the channel is poor, and a blocking condition for blocking the second service is met, or on the contrary, when the ratio of the uplink transmit power of the channel to the greatest transmit power of the terminal is not greater than the second threshold, it indicates that the channel quality of the channel is relatively good, and in this case, both of the first service and the second service in the concurrent services may maintain relatively good service transmission quality. In this embodiment, the second threshold is 1/4. It may be understood that the foregoing value of the second threshold is only a preferred value, and in a practical application process, the second threshold may be adjusted within a range, and is not limited herein.

Step 504: The terminal confirms that a preset blocking condition is met.

In this embodiment, when the downlink receive power of the channel is less than the first threshold, and the ratio of the uplink transmit power of the channel to the greatest transmit power of the terminal is greater than the second threshold, the preset blocking condition is met. That is, in this embodiment, the preset blocking condition is that the downlink receive power of the channel is less than the first threshold, and the ratio of the uplink transmit power of the channel to the greatest transmit power of the terminal is greater than the second threshold.

Step 505: The terminal blocks a second service.

The terminal blocks the second service when the channel quality information of the channel meets the preset blocking condition. In this embodiment, a blocking class parameter corresponding to the channel quality information of the channel is preset in the terminal according to a specific application scenario, and the terminal blocking the second service may include that the terminal obtains the corresponding blocking class parameter according to the channel quality information of the channel, and the terminal blocks the second service on an uplink and/or a downlink according to the blocking class parameter. For example, when the ratio of the uplink transmit power of the channel to the greatest transmit power of the terminal and the downlink receive power meet a first requirement, the terminal obtains a first class blocking parameter, and the terminal blocks the second service on the uplink and the downlink according to the first class blocking parameter. The terminal obtains a second class blocking parameter, and the terminal blocks the second service only on the uplink according to the second class blocking parameter, and the terminal obtains a third class blocking parameter when the ratio of the uplink transmit power of the channel to the greatest transmit power of the terminal and the downlink receive power meet a third requirement, and the terminal blocks the second service only on the downlink according to the third class blocking parameter. In this embodiment, a different corresponding blocking class parameter is set according to different channel quality information in order to perform a different-class blocking scheme in a case of different channel quality information. It may be understood that in practical application, another blocking policy may be used to block a second service. For example, with reference to the solution that is mentioned in the background and for reducing the voice service drop rate in the case of the concurrent services, when a blocking process is performed on the second service, according to whether a user directly perceives the second service, a second service that the user does not directly perceive is blocked, and a second service that the user can directly perceive is maintained. A specific blocking policy for blocking the second service is not limited herein.

Step 506: Perform another process.

In this embodiment, another process is performed when the downlink receive power of the channel is not less than the first threshold, or the ratio of the uplink transmit power of the channel to the greatest transmit power of the terminal is not greater than the second threshold. It may be understood that performing the other process may be ending a process, that is, the terminal performs no processing on the first service and the second service, or the terminal performs another processing process on the first service and the second service, or returns to step 501, which is not limited herein.

In the technical solutions provided in this embodiment of the present disclosure, a terminal obtains channel quality information of a channel that carries concurrent services, and blocks a second service with a lower service priority in the concurrent services when the channel quality information meets a preset blocking condition. Therefore, in this embodiment of the present disclosure, whether to block the service with a lower service priority to optimize network resource allocation may be determined according to the channel quality information of the channel that carries the concurrent services, thereby ensuring that a service with a higher service priority maintains better service transmission quality in the concurrent services.

Further, in the technical solutions provided in this embodiment of the present disclosure, the terminal comprehensively analyzes an uplink transmit power of the channel and a downlink receive power of the channel, to confirm whether the preset blocking condition is met in order to block a second service with a lower service priority in the concurrent services when channel quality is poor. In addition, in this embodiment of the present disclosure, a different-class blocking scheme may be performed on the second service according to severity of the channel quality.

For ease of understanding, using a practical application scenario, the following provides a detailed description of the method for processing concurrent services described in the foregoing embodiments.

The concurrent services include a voice service and a data service that are based on an LTE network, where a service priority of the voice service is higher than that of the data service, and for example, the terminal is a mobile phone.

To reduce a voice service drop rate in the concurrent services, a solution in this embodiment of the present disclosure may be as follows.

The mobile phone obtains channel quality information of a channel that carries the concurrent services, and the mobile phone blocks the data service when the channel quality information meets a preset blocking condition.

The foregoing preset blocking condition may be any one or multiple of a ratio of an uplink transmit power of the channel to a greatest transmit power of the terminal being greater than 1/4, an RSCP of the channel being less than −90 dBm, or an SINR of the channel being less than −5 dB.

In the technical solutions provided in the practical application scenario in this embodiment of the present disclosure, a mobile phone obtains channel quality information of a channel that carries concurrent services, and blocks a data service with a lower service priority in the concurrent services when the channel quality information meets a preset blocking condition. Therefore, in this embodiment of the present disclosure, whether to block the data service to optimize network resource allocation may be determined according to the channel quality information of the channel that carries the concurrent services, thereby ensuring that a voice service maintains better service transmission quality in the concurrent services, and effectively reducing a voice service drop rate in the concurrent services.

The foregoing describes the method for processing concurrent services in the embodiments of the present disclosure, and the following describes a terminal in the embodiments of the present disclosure. It should be noted that concurrent services run on the terminal, and in the embodiments of the present disclosure, the concurrent services include a first service and a second service. A service priority of the first service is higher than a service priority of the second service. It may be understood that in the concurrent services, a service priority of each service may be set according to a user requirement, or may be set by default in a system. This is not limited herein. In a practical application process, there may be one or more first services and second services, and this is not limited herein. It may be understood that in some embodiments, the present disclosure may further include a determining apparatus determining whether the two services are in a service concurrent state and/or a determining apparatus determining the service priorities of the two services.

Figure 6:
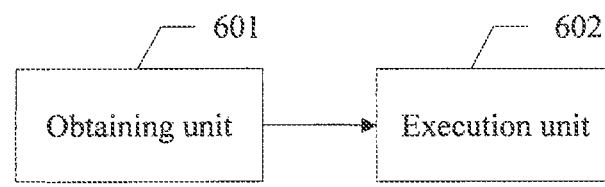
FIG. 6 is a schematic diagram of an embodiment of a terminal according to an embodiment of the present disclosure.

Referring to FIG. 6, an embodiment of a terminal according to an embodiment of the present disclosure includes an obtaining unit 601 configured to obtain channel quality information of a channel that carries concurrent services, and an execution unit 602 configured to block a second service when the channel quality information meets a preset blocking condition.

For ease of understanding, in the following, a specific application scenario is used as an example to describe an internal operation process of the terminal in this embodiment.

The obtaining unit 601 obtains the channel quality information of the channel that carries the concurrent services, and the execution unit 602 blocks the second service when the channel quality information meets the preset blocking condition.

In the technical solutions provided in this embodiment of the present disclosure, a terminal obtains, using an obtaining unit 601, channel quality information of a channel that carries concurrent services, and blocks, using an execution unit 602, a second service with a lower service priority in the concurrent services when the channel quality information meets a preset blocking condition. Therefore, in this embodiment of the present disclosure, whether to block the service with a lower service priority to optimize network resource allocation may be determined according to the channel quality information of the channel that carries the concurrent services, thereby ensuring that a service with a higher service priority maintains better service transmission quality in the concurrent services.

It may be understood that according to different description manners of the preset blocking condition, the terminal may correspondingly have multiple different structures, which are separately described in the following.

1: Specific terminal structure based on a first preset blocking condition.

Figure 7:
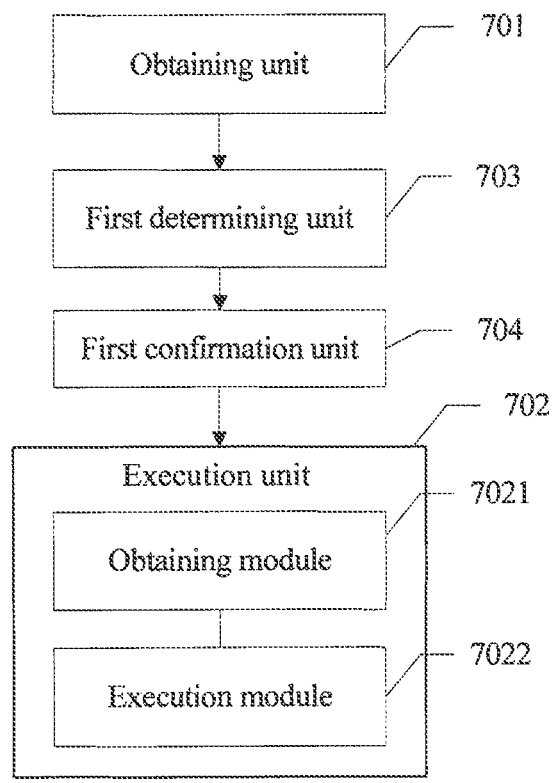
FIG. 7 is a schematic diagram of another embodiment of a terminal according to an embodiment of the present disclosure.

Referring to FIG. 7, another embodiment of a terminal according to an embodiment of the present disclosure includes an obtaining unit 701 configured to obtain channel quality information of a channel that carries concurrent services, and an execution unit 702 configured to block a second service when the channel quality information meets a preset blocking condition.

The terminal in this embodiment of the present disclosure further includes a first determining unit 703 configured to determine whether a ratio of an uplink transmit power of the channel to a greatest transmit power of the terminal is greater than a preset ratio, and a first confirmation unit 704 configured to confirm that the preset blocking condition is met when the ratio of the uplink transmit power of the channel to the greatest transmit power of the terminal is greater than the preset ratio.

Preferably, the execution unit 702 in this embodiment of the present disclosure includes an obtaining module 7021 configured to obtain a corresponding blocking class parameter according to the channel quality information, and an execution module 7022 configured to block a second service on an uplink and/or a downlink according to the blocking class parameter.

In the technical solutions provided in this embodiment of the present disclosure, a terminal obtains, using an obtaining unit 701, channel quality information of a channel that carries concurrent services, and blocks, using an execution unit 702, a second service with a lower service priority in the concurrent services when the channel quality information meets a preset blocking condition. Therefore, in this embodiment of the present disclosure, whether to block the service with a lower service priority to optimize network resource allocation may be determined according to the channel quality information of the channel that carries the concurrent services, thereby ensuring that a service with a higher service priority maintains better service transmission quality in the concurrent services.

Further, in the technical solutions provided in this embodiment of the present disclosure, the terminal determines, using a first determining unit 703, whether a ratio of an uplink transmit power of the channel to a greatest transmit power of the terminal is greater than a preset ratio, to confirm, using a first confirmation unit 704, whether the preset blocking condition is met in order to block a second service with a lower service priority in the concurrent services when channel quality is poor. In addition, in this embodiment of the present disclosure, a different-class blocking scheme may be performed on the second service according to severity of the channel quality.

2: Specific terminal structure based on a second preset blocking condition.

Figure 8:
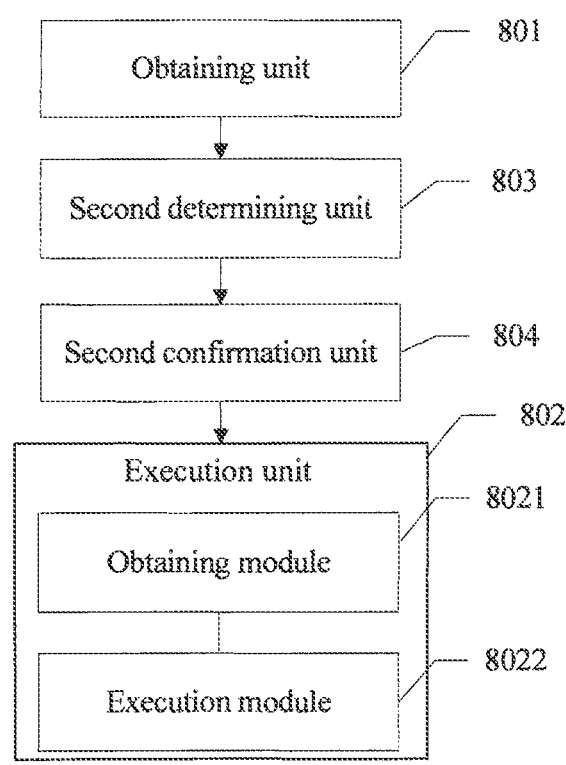
FIG. 8 is a schematic diagram of another embodiment of a terminal according to an embodiment of the present disclosure.

Referring to FIG. 8, another embodiment of a terminal according to an embodiment of the present disclosure includes an obtaining unit 801 configured to obtain channel quality information of a channel that carries concurrent services, and an execution unit 802 configured to block a second service when the channel quality information meets a preset blocking condition.

Further, the terminal in this embodiment of the present disclosure further includes a second determining unit 803 configured to determine whether a downlink receive power of the channel is less than a preset reference value, and a second confirmation unit 804 configured to confirm that the preset blocking condition is met when the downlink receive power of the channel is less than the preset reference value.

Preferably, the execution unit 802 in this embodiment of the present disclosure includes an obtaining module 8021 configured to obtain a corresponding blocking class parameter according to the channel quality information, and an execution module 8022 configured to block a second service on an uplink and/or a downlink according to the blocking class parameter.

In the technical solutions provided in this embodiment of the present disclosure, a terminal obtains, using an obtaining unit 801, channel quality information of a channel that carries concurrent services, and blocks, using an execution unit 802, a second service with a lower service priority in the concurrent services when the channel quality information meets a preset blocking condition. Therefore, in this embodiment of the present disclosure, whether to block the service with a lower service priority to optimize network resource allocation may be determined according to the channel quality information of the channel that carries the concurrent services, thereby ensuring that a service with a higher service priority maintains better service transmission quality in the concurrent services.

Further, in the technical solutions provided in this embodiment of the present disclosure, the terminal determines, using a second determining unit 803, whether a downlink receive power of the channel is less than a preset reference value, to confirm, using a second confirmation unit 804, whether the preset blocking condition is met in order to block a second service with a lower service priority in the concurrent services when channel quality is poor. In addition, in this embodiment of the present disclosure, a different-class blocking scheme may be performed on the second service according to severity of the channel quality.

3: Specific terminal structure based on a third preset blocking condition.

Figure 9:
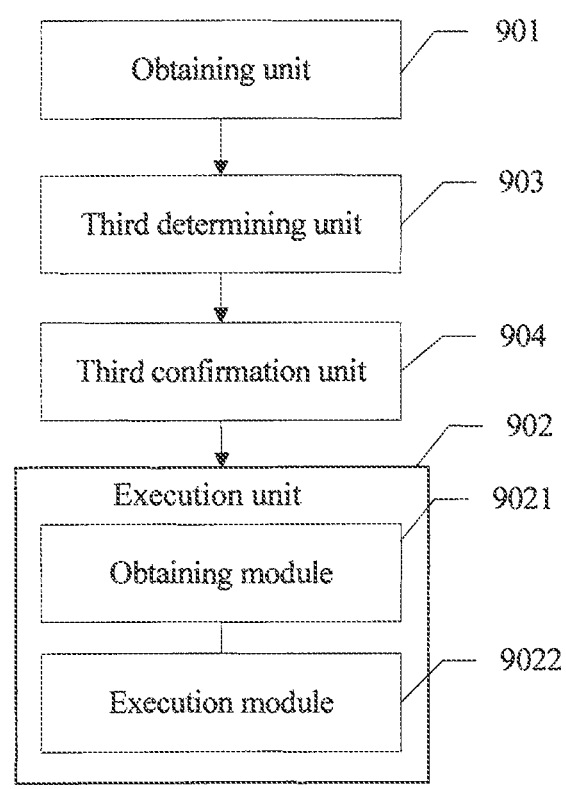
FIG. 9 is a schematic diagram of another embodiment of a terminal according to an embodiment of the present disclosure.

Referring to FIG. 9, another embodiment of a terminal according to an embodiment of the present disclosure includes an obtaining unit 901 configured to obtain channel quality information of a channel that carries concurrent services, and an execution unit 902 configured to block a second service when the channel quality information meets a preset blocking condition.

The terminal in this embodiment of the present disclosure further includes a third determining unit 903 configured to determine whether a downlink received carrier-to-interference ratio of the channel is less than a preset carrier-to-interference ratio, and a third confirmation unit 904 configured to confirm that the preset blocking condition is met when the downlink received carrier-to-interference ratio of the channel is less than the preset carrier-to-interference ratio.

Preferably, the execution unit 902 in this embodiment of the present disclosure includes an obtaining module 9021 configured to obtain a corresponding blocking class parameter according to the channel quality information, and an execution module 9022 configured to block a second service on an uplink and/or a downlink according to the blocking class parameter.

In the technical solutions provided in this embodiment of the present disclosure, a terminal obtains, using an obtaining unit 901, channel quality information of a channel that carries concurrent services, and blocks, using an execution unit 902, a second service with a lower service priority in the concurrent services when the channel quality information meets a preset blocking condition. Therefore, in this embodiment of the present disclosure, whether to block the service with a lower service priority to optimize network resource allocation may be determined according to the channel quality information of the channel that carries the concurrent services, thereby ensuring that a service with a higher service priority maintains better service transmission quality in the concurrent services.

Further, in the technical solutions provided in this embodiment of the present disclosure, the terminal determines, using a third determining unit 903, whether a downlink received carrier-to-interference ratio of the channel is less than a preset carrier-to-interference ratio, to confirm, using a third confirmation unit 904, whether the preset blocking condition is met in order to block a second service with a lower service priority in the concurrent services when channel quality is poor. In addition, in this embodiment of the present disclosure, a different-class blocking scheme may be performed on the second service according to severity of the channel quality.

4: Specific terminal structure based on a fourth preset blocking condition.

Figure 10:
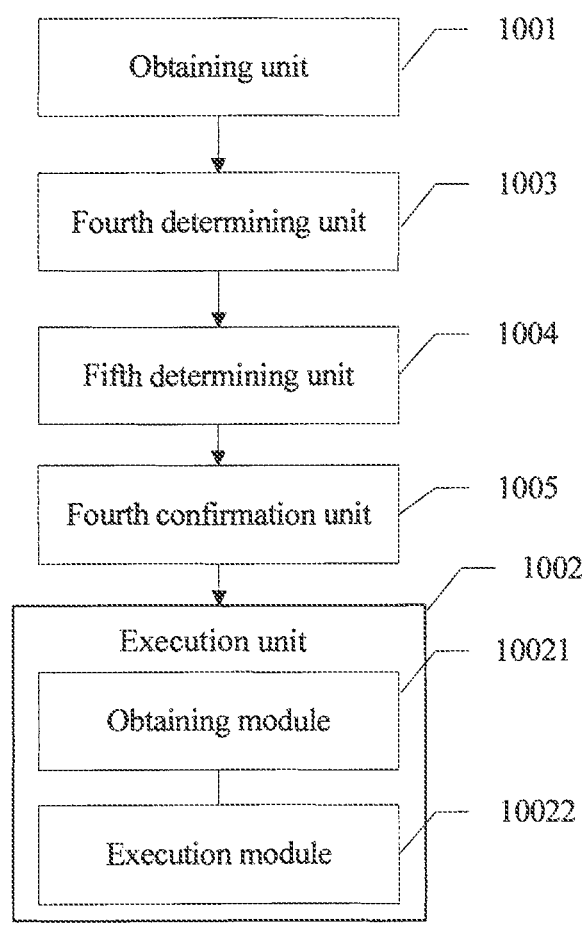
FIG. 10 is a schematic diagram of another embodiment of a terminal according to an embodiment of the present disclosure.

Referring to FIG. 10, another embodiment of a terminal according to an embodiment of the present disclosure includes an obtaining unit 1001 configured to obtain channel quality information of a channel that carries concurrent services, and an execution unit 1002 configured to block a second service when the channel quality information meets a preset blocking condition.

The terminal in this embodiment of the present disclosure further includes a fourth determining unit 1003 configured to determine whether a downlink receive power of the channel is less than a first threshold, a fifth determining unit 1004 configured to determine whether a ratio of an uplink transmit power of the channel to a greatest transmit power of the terminal is greater than a second threshold when the downlink receive power of the channel is not less than the first threshold, and a fourth confirmation unit 1005 configured to confirm that the preset blocking condition is met when the ratio of the uplink transmit power of the channel to the greatest transmit power of the terminal is greater than the second threshold.

Preferably, the execution unit 1002 in this embodiment of the present disclosure includes an obtaining module 10021 configured to obtain a corresponding blocking class parameter according to the channel quality information, and an execution module 10022 configured to block a second service on an uplink and/or a downlink according to the blocking class parameter.

In the technical solutions provided in this embodiment of the present disclosure, a terminal obtains, using an obtaining unit 1001, channel quality information of a channel that carries concurrent services, and blocks, using an execution unit 1002, a second service with a lower service priority in the concurrent services when the channel quality information meets a preset blocking condition. Therefore, in this embodiment of the present disclosure, whether to block the service with a lower service priority to optimize network resource allocation may be determined according to the channel quality information of the channel that carries the concurrent services, thereby ensuring that a service with a higher service priority maintains better service transmission quality in the concurrent services.

Further, in the technical solutions provided in this embodiment of the present disclosure, after determining, using a fourth determining unit 1003, whether a downlink receive power of the channel is less than a first threshold, the terminal further determines, using a fifth determining unit 1004, whether a ratio of an uplink transmit power of the channel to a greatest transmit power of the terminal is greater than a second threshold, to confirm, using a fourth confirmation unit 1005, whether the preset blocking condition is met in order to block a second service with a lower service priority in the concurrent services when channel quality is poor. In addition, in this embodiment of the present disclosure, a different-class blocking scheme may be performed on the second service according to severity of the channel quality.

Figure 11:
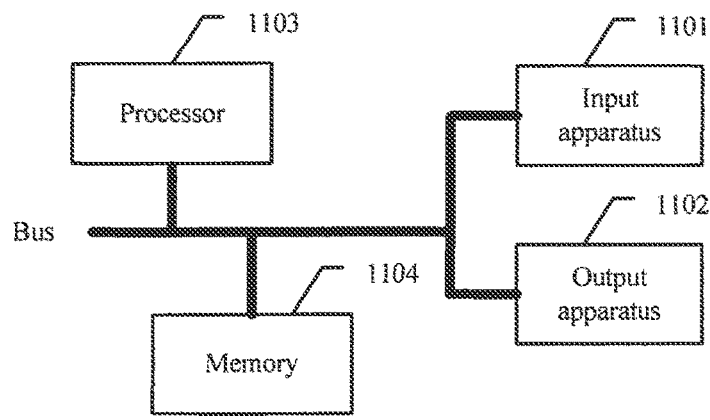
FIG. 11 is a schematic diagram of another embodiment of a terminal according to an embodiment of the present disclosure.

The foregoing describes the terminal in the embodiments of the present disclosure from a perspective of a modular functional entity, and the following describes the terminal in the embodiments of the present disclosure from a perspective of hardware processing. Referring to FIG. 11, another embodiment of a terminal according to an embodiment of the present disclosure includes an input apparatus 1101, an output apparatus 1102, a processor 1103, and a memory 1104 (there may be one or more processors 1103 in the terminal, and one processor 1103 is used as an example in FIG. 11). In some embodiments of the present disclosure, the input apparatus 1101, the output apparatus 1102, the processor 1103, and the memory 1104 may be connected using a bus or in another manner, and a bus connection is used as an example in FIG. 11, where by invoking an operation instruction stored in the memory 1104, the processor 1103 is configured to obtain channel quality information of a channel that carries concurrent services, and block a second service when the channel quality information meets a preset blocking condition.

In some embodiments of the present disclosure, the processor 1103 is further configured to determine whether a ratio of an uplink transmit power of the channel to a greatest transmit power of the terminal is greater than a preset ratio, and confirm that the preset blocking condition is met when the ratio of the uplink transmit power of the channel to the greatest transmit power of the terminal is greater than the preset ratio.

In some embodiments of the present disclosure, the processor 1103 is further configured to determine whether a downlink receive power of the channel is less than a preset reference value, and confirm that the preset blocking condition is met when the downlink receive power of the channel is less than the preset reference value.

In some embodiments of the present disclosure, the processor 1103 is further configured to determine whether a downlink received carrier-to-interference ratio of the channel is less than a preset carrier-to-interference ratio, and confirm that the preset blocking condition is met when the downlink received carrier-to-interference ratio of the channel is less than the preset carrier-to-interference ratio.

In some embodiments of the present disclosure, the processor 1103 is further configured to determine whether a downlink receive power of the channel is less than a first threshold, determine whether a ratio of an uplink transmit power of the channel to a greatest transmit power of the terminal is greater than a second threshold when the downlink receive power of the channel is not less than the first threshold, and confirm that the preset blocking condition is met when the ratio of the uplink transmit power of the channel to the greatest transmit power of the terminal is greater than the second threshold.

In some embodiments of the present disclosure, the processor 1103 is further configured to obtain a corresponding blocking class parameter according to the channel quality information, and block a second service on an uplink and/or a downlink according to the blocking class parameter.

In the technical solutions provided in this embodiment of the present disclosure, a terminal obtains channel quality information of a channel that carries concurrent services, and blocks a second service with a lower service priority in the concurrent services when the channel quality information meets a preset blocking condition. Therefore, unlike the prior art, in this embodiment of the present disclosure, whether to block the service with a lower service priority to optimize network resource allocation may be determined according to the channel quality information of the channel that carries the concurrent services, thereby ensuring that a service with a higher service priority maintains better service transmission quality in the concurrent services.

Figure 12:
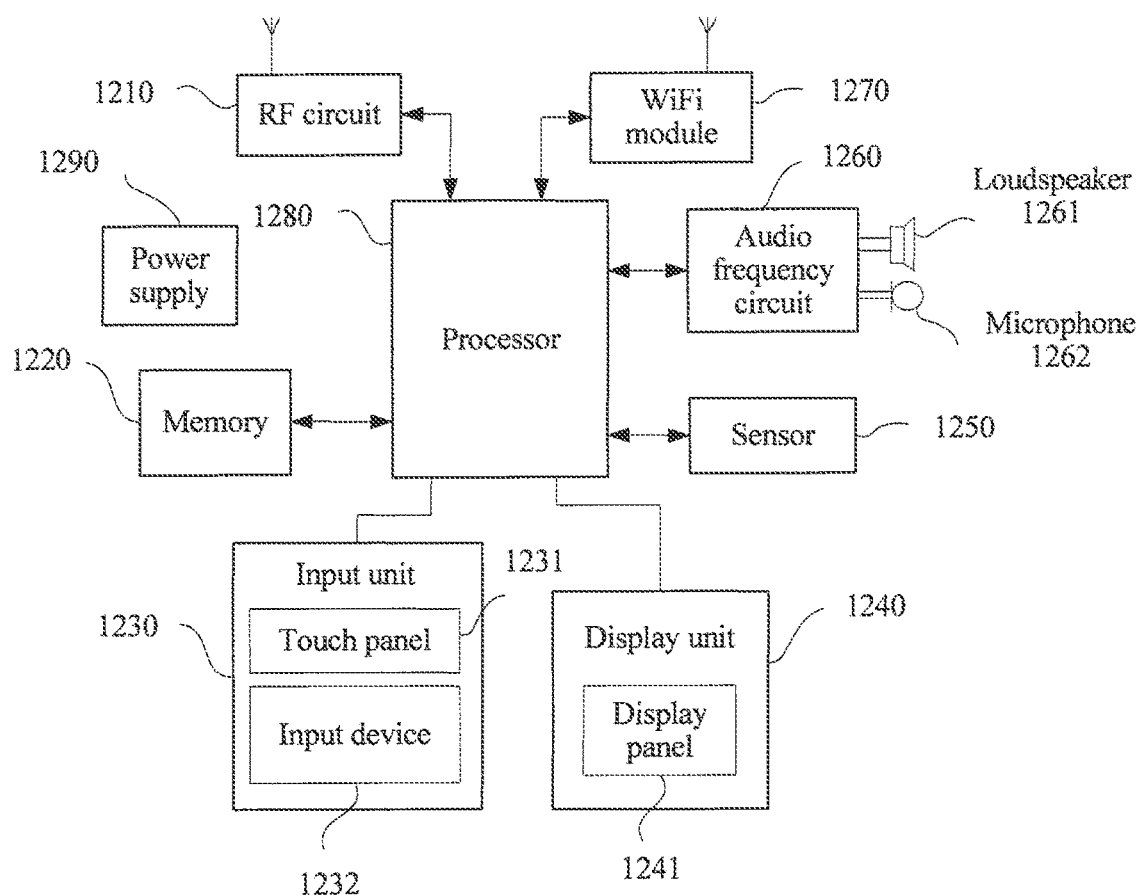
FIG. 12 is a schematic diagram of another embodiment of a terminal according to an embodiment of the present disclosure.

The following elaborates the terminal in the embodiments of the present disclosure with reference to FIG. 12. As shown in FIG. 12, for ease of description, only parts related to the embodiments of the present disclosure are illustrated. For technical details that are not disclosed, refer to the method embodiment parts of the present disclosure. The terminal may be any terminal device, including a mobile phone, a tablet computer, a personal digital assistant (PDA), a point of sales (POS) device, a vehicle-mounted computer, or the like, and for example, the terminal is a mobile phone.

FIG. 12 shows a block diagram of a partial structure of a mobile phone related to the terminal provided in this embodiment of the present disclosure. Referring to FIG. 12, the mobile phone includes parts such as a radio frequency (RF) circuit 1210, a memory 1220, an input unit 1230, a display unit 1240, a sensor 1250, an audio frequency circuit 1260, a WiFi module 1270, a processor 1280, and a power supply 1290. Persons skilled in the art may understand that a structure of the mobile phone shown in FIG. 12 imposes no limitation on the mobile phone, and instead the mobile phone may include components more or fewer than those shown in FIG. 12, or a combination of some components, or different component arrangements.

The following describes the parts of the mobile phone in detail with reference to FIG. 12.

The RF circuit 1210 may be configured to receive and send a signal in an information receiving or sending process or a call process, and in particular, after receiving downlink information from a base station, send the downlink information to the processor 1280 for processing, and in addition, send designed uplink data to the base station. Generally, the RF circuit 1210 includes but is not limited to an antenna, at least one amplifier, a transceiver, a coupler, a low noise amplifier (LNA), a duplexer, or the like. In addition, the RF circuit 1210 may further communicate with a network and another device by means of wireless communications. The foregoing wireless communications may use any communications standard or protocol, which includes but is not limited to a Global System for Mobile Communications (GSM), a general packet radio service (GPRS), Code Division Multiple Access (CDMA), WCDMA, LTE.

The memory 1220 may be configured to store a software program and a module. The processor 1280 performs various function applications and data processing of the mobile phone by running the software program and the module that are stored in the memory 1220. The memory 1220 may mainly include a program storage area and a data storage area, where the program storage area may store an operating system, an application program required by at least one function (such as a voice playing function and an image playing function), and the like, and the data storage area may store data (such as audio data and a phone book) created according to use of the mobile phone, and the like. In addition, the memory 1220 may include a high-speed random access memory (RAM), and may further include a nonvolatile memory, such as at least one magnetic disk storage component, a flash memory component, or another volatile solid-state storage component.

The input unit 1230 may be configured to receive entered digital or character information, and generate key signal input related to user setting and function control of the mobile phone. Further, the input unit 1230 may include a touch panel 1231 and an input device 1232. The touch panel 1231, which is also referred to as a touchscreen, may collect a touch operation (for example, an operation of the user on the touch panel 1231 or near the touch panel 1231 using any proper object or accessory, such as a finger or a stylus) of the user on or near the touch panel 1231, and drive a corresponding connected apparatus according to a preset program. Optionally, the touch panel 1231 may include two parts a touch detection apparatus and a touch controller. The touch detection apparatus detects a touch position of the user, detects a signal brought by a touch operation, and transfers the signal to the touch controller. The touch controller receives touch information from the touch detection apparatus, converts the touch information into coordinates of a touch point, then sends the coordinates of the touch point to the processor 1280, and can receive and execute a command sent by the processor 1280. In addition, the touch panel 1231 may be implemented using multiple types, such as a resistive type, a capacitive type, an infrared ray, and a surface acoustic wave. The input device 1232 may include but is not limited to one or more of a physical keyboard, a function key (for example, a volume control key or an on/off key), a trackball, a mouse, an operating lever, or the like.

The display unit 1240 may be configured to display information entered by the user or information provided for the user, and various menus of the mobile phone. The display unit 1240 may include a display panel 1241. Optionally, a form such as a liquid crystal display (LCD) or an organic light-emitting diode (OLED) may be used to configure the display panel 1241. Further, the touch panel 1231 may cover the display panel 1241. When detecting a touch operation on or near the touch panel 1231, the touch panel 1231 transmits the touch operation to the processor 1280 to determine a type of the touch event, and then the processor 1280 provides corresponding visual output on the display panel 1241 according to the type of the touch event. Although, in FIG. 12, the touch panel 1231 and the display panel 1241 are used as two independent components to implement input and output functions of the mobile phone, in some embodiments, the touch panel 1231 and the display panel 1241 may be integrated to implement the input and output functions of the mobile phone.

The mobile phone may further include at least one sensor 1250, such as a light sensor, a motion sensor, or another sensor. Further, the light sensor may include an ambient light sensor and a proximity sensor. The ambient light sensor may adjust luminance of the display panel 1241 according to brightness of ambient light, and when the mobile phone moves near an ear, the proximity sensor may turn off the display panel 1241 and/or backlight. As one motion sensor, an accelerometer sensor can detect values of accelerations in all directions (generally, three axes), can detect a value and a direction of the gravity in a static state, and can be used for an application that identifies a mobile phone posture (such as screen orientation, a related game, or magnetometer posture calibration), a function related to vibration identification (such as a pedometer or a stroke), and the like. For another sensor, such as a gyroscope, a barometer, a hygrometer, a thermometer, or an infrared sensor, that can be further disposed on the mobile phone, details are not described herein.

The audio frequency circuit 1260, a loudspeaker 1261, and a microphone 1262 may provide an audio interface between the user and the mobile phone. The audio frequency circuit 1260 may transmit, to the loudspeaker 1261, a received electrical signal converted from audio data, and the loudspeaker 1261 converts the electrical signal into a sound signal for output. In another aspect, the microphone 1262 converts a collected sound signal into an electrical signal, which is then received by the audio frequency circuit 1260 and converted into audio data, and the audio data is output to the processor 1280 for processing and then is sent to, for example, another mobile phone using the RF circuit 1210, or the audio data is output to the memory 1220 for further processing.

WiFi belongs to a short-distance wireless transmission technology. The mobile phone may help, using the WiFi module 1270, the user to send and receive an email, browse a web page, access streaming media, and the like. The WiFi module 1270 provides wireless broadband Internet access for the user. Although FIG. 12 shows the WiFi module 1270, it may be understood that the WiFi module 1270 is not a mandatory part of the mobile phone, and may be completely omitted according to a need without changing the essence of the present disclosure.

The processor 1280 is a control center of the mobile phone, is connected to each part of the entire mobile phone using various interfaces and lines, and by running or executing the software program and/or the module that are/is stored in the memory 1220 and by invoking data stored in the memory 1220, performs various functions of the mobile phone and data processing in order to perform overall monitoring on the mobile phone. Optionally, the processor 1280 may include one or more processing units. Preferably, an application processor and a modem processor may be integrated into the processor 1280, where the application processor mainly processes an operating system, a user interface, an application program, or the like, and the modem processor mainly processes wireless communications. It may be understood that the foregoing modem processor may not be integrated into the processor 1280.

The mobile phone further includes the power supply 1290 (such as a battery) that supplies power to each part. Preferably, the power supply 1290 may be logically connected to the processor 1280 using a power management system such that functions such as management of charging, discharging, and power consumption are implemented using the power management system.

Though not shown, the mobile phone may further include a camera, a Bluetooth module, and the like, and details are not described herein.

In this embodiment of the present disclosure, the processor 1280 is configured to obtain channel quality information of a channel that carries concurrent services, and block a second service when the channel quality information meets a preset blocking condition.

In some embodiments of the present disclosure, the processor 1280 is further configured to determine whether a ratio of an uplink transmit power of the channel to a greatest transmit power of the terminal is greater than a preset ratio, and confirm that the preset blocking condition is met when the ratio of the uplink transmit power of the channel to the greatest transmit power of the terminal is greater than the preset ratio.

In some embodiments of the present disclosure, the processor 1280 is further configured to determine whether a downlink receive power of the channel is less than a preset reference value, and confirm that the preset blocking condition is met when the downlink receive power of the channel is less than the preset reference value.

In some embodiments of the present disclosure, the processor 1280 is further configured to determine whether a downlink received carrier-to-interference ratio of the channel is less than a preset carrier-to-interference ratio, and confirm that the preset blocking condition is met when the downlink received carrier-to-interference ratio of the channel is less than the preset carrier-to-interference ratio.

In some embodiments of the present disclosure, the processor 1280 is further configured to determine whether a downlink receive power of the channel is less than a first threshold, determine whether a ratio of an uplink transmit power of the channel to a greatest transmit power of the terminal is greater than a second threshold when the downlink receive power of the channel is not less than the first threshold, and confirm that the preset blocking condition is met when the ratio of the uplink transmit power of the channel to the greatest transmit power of the terminal is greater than the second threshold.

In some embodiments of the present disclosure, the processor 1280 is further configured to obtain a corresponding blocking class parameter according to the channel quality information, and block a second service on an uplink and/or a downlink according to the blocking class parameter.

In the technical solutions provided in this embodiment of the present disclosure, a terminal obtains channel quality information of a channel that carries concurrent services, and blocks a second service with a lower service priority in the concurrent services when the channel quality information meets a preset blocking condition. Therefore, in this embodiment of the present disclosure, whether to block the service with a lower service priority to optimize network resource allocation may be determined according to the channel quality information of the channel that carries the concurrent services, thereby ensuring that a service with a higher service priority maintains better service transmission quality in the concurrent services.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

The integrated unit may be stored in a computer-readable storage medium when the integrated unit is implemented in the form of a software functional unit and sold or used as an independent product. Based on such an understanding, the technical solutions of the present disclosure essentially, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes any medium that can store program code, such as a Universal Serial Bus (USB) flash drive, a removable hard disk, a read-only memory (ROM), a RAM, a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present disclosure.

What is claimed is:

1. A method for processing concurrent services and implemented by a terminal, the method comprising:
   obtaining channel quality information of a channel providing concurrent services, wherein the concurrent services comprise a first service and a second service, and wherein a first service priority of the first service is higher than a second service priority of the second service;
   determining whether a downlink receive power of the channel is less than a first threshold;
   determining whether a ratio of an uplink transmit power of the channel to a greatest transmit power of the terminal is greater than a preset ratio when the downlink receive power is less than the first threshold;
   determining that the channel quality information meets a preset blocking condition when the downlink receive power is less than the first threshold and when the ratio is greater than the preset ratio; and
   blocking the second service when the channel quality information meets the preset blocking condition.

2. The method of claim 1, wherein the uplink transmit power is a transmit power from the terminal to a base station or a core network device.

3. The method of claim 1, wherein the downlink receive power is a reference signal received power (RSRP).

4. The method of claim 1, wherein the downlink receive power is a received signal code power (RSCP).

5. The method of claim 1, further comprising further determining whether the channel quality information meets the preset blocking condition further based on a downlink received carrier-to-interference ratio of the channel being less than a preset carrier-to-interference ratio.

6. The method of claim 5, wherein the downlink received carrier-to-interference ratio comprises a signal-to-interference-plus-noise ratio (SINR).

7. The method of claim 5, wherein the downlink received carrier-to-interference ratio comprises an energy per chip to noise power spectral density ratio ($E_c/N_0$).

8. The method of claim 1, wherein the downlink receive power is a receive power from a base station or a core network device to the terminal.

9. The method of claim 1, wherein blocking the second service comprises:
   obtaining a corresponding blocking class parameter according to the channel quality information; and
   blocking the second service on an uplink and a downlink according to the blocking class parameter.

10. The method of claim 1, wherein blocking the second service comprises:
    obtaining a corresponding blocking class parameter according to the channel quality information; and
    blocking the second service on an uplink according to the blocking class parameter.

11. The method of claim 1, wherein blocking the second service comprises:
    obtaining a corresponding blocking class parameter according to the channel quality information; and
    blocking the second service on a downlink according to the blocking class parameter.

12. The method of claim 1, wherein the first service is a voice service, and wherein the second service is a data service.

13. The method of claim 1, wherein the preset ratio is 0.25.

14. The method of claim 1, wherein the ratio comprises a numerator and a denominator, wherein the numerator comprises the uplink transmit power, and wherein the denominator comprises the greatest transmit power.

15. A terminal comprising:
    a memory;
    a bus coupled to the memory; and
    a processor coupled to the memory via the bus and configured to:
      obtain channel quality information of a channel providing concurrent services, wherein the concurrent services run on the terminal and comprise a first service and a second service, and wherein a first service priority of the first service is higher than a second service priority of the second service;
      determine whether a downlink receive power of the channel is less than a first threshold;
      determine whether a ratio of an uplink transmit power of the channel to a greatest transmit power of the terminal is greater than a preset ratio when the downlink receive power is less than the first threshold;
      determine that the channel quality information meets a preset blocking condition when the downlink receive power is less than the first threshold and when the ratio is greater than the preset ratio; and
      block the second service when the channel quality information meets the preset blocking condition.

16. The terminal of claim 15, wherein the uplink transmit power is a transmit power from the terminal to a base station or a core network device.

17. The terminal of claim 15, wherein the processor is further configured to further determine whether the channel quality information meets the preset blocking condition further based on a downlink received carrier-to-interference ratio of the channel being less than a preset carrier-to-interference ratio.

18. The terminal of claim 15, wherein the downlink receive power is a receive power from a base station or a core network device to the terminal.

19. The terminal of claim 15, wherein the processor is further configured to:
    obtain a corresponding blocking class parameter according to the channel quality information; and
    block the second service on an uplink and a downlink according to the blocking class parameter.

20. The terminal of claim 15, wherein the processor is further configured to:
  obtain a corresponding blocking class parameter according to the channel quality information; and
  block the second service on an uplink according to the blocking class parameter.

21. The terminal of claim 15, wherein the processor is further configured to:
  obtain a corresponding blocking class parameter according to the channel quality information; and
  block the second service on a downlink according to the blocking class parameter.

22. The terminal of claim 15, wherein the preset ratio is 0.25.

23. The terminal of claim 15, wherein the ratio comprises a numerator and a denominator, wherein the numerator comprises the uplink transmit power, and wherein the denominator comprises the greatest transmit power.

24. A computer program product comprising computer executable instructions stored on a non-transitory medium that when executed by a processor cause an apparatus to:
  obtain channel quality information of a channel providing concurrent services, wherein the concurrent services run on the apparatus and comprise a first service and a second service, and wherein a first service priority of the first service is higher than a second service priority of the second service;
  determine whether a downlink receive power of the channel is less than a first threshold;
  determine whether a ratio of an uplink transmit power of the channel to a greatest transmit power of the apparatus is greater than a preset ratio when the downlink receive power is less than the first threshold;
  determine that the channel quality information meets a preset blocking condition when the downlink receive power is less than the first threshold and when the ratio is greater than the preset ratio; and
  block the second service when the channel quality information meets the preset blocking condition.

25. The computer program product of claim 24, wherein the ratio comprises a numerator and a denominator, wherein the numerator comprises the uplink transmit power, and wherein the denominator comprises the greatest transmit power.

* * * * *